(12) United States Patent
Jiang et al.

(10) Patent No.: US 8,224,976 B2
(45) Date of Patent: Jul. 17, 2012

(54) USING A SERVER'S CAPABILITY PROFILE TO ESTABLISH A CONNECTION

(75) Inventors: Dongyi Jiang, Milpitas, CA (US); Laxminarayana Tumuluru, Fremont, CA (US); Jianwen Pi, Santa Clara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 188 days.

(21) Appl. No.: 12/343,694

(22) Filed: Dec. 24, 2008

(65) Prior Publication Data
US 2010/0161741 A1  Jun. 24, 2010

(51) Int. Cl.
*G06F 15/16* (2006.01)

(52) U.S. Cl. ........ 709/228; 709/220; 709/222; 709/223; 709/224; 709/226

(58) Field of Classification Search ........ 709/228, 709/220, 222, 223, 224, 226
See application file for complete search history.

(56) References Cited

U.S. PATENT DOCUMENTS

| 7,216,164 | B1 | 5/2007 | Whitmore et al. | |
| 2002/0120727 | A1* | 8/2002 | Curley et al. | 709/223 |
| 2002/0142749 | A1* | 10/2002 | Muniere et al. | 455/403 |
| 2004/0153669 | A1 | 8/2004 | Yang et al. | |
| 2005/0097167 | A1* | 5/2005 | Ramanathan et al. | 709/203 |
| 2006/0031571 | A1* | 2/2006 | Banerjee et al. | 709/238 |
| 2006/0126640 | A1* | 6/2006 | Sood et al. | 370/395.32 |
| 2007/0217430 | A1* | 9/2007 | Baird et al. | 370/395.52 |
| 2008/0181213 | A1* | 7/2008 | Ovsiannikov et al. | 370/389 |
| 2009/0003365 | A1* | 1/2009 | Lin | 370/401 |
| 2010/0057891 | A1* | 3/2010 | Tsai | 709/220 |

OTHER PUBLICATIONS http://en.wikipedia.org/wiki/Syn_cookie; "SYN cookies", 2 pages, Oct. 17, 2008.
http://en.wikipedia.org/wiki/SYN_(TCP); "Transmission Control Protocol", 17 pages, Nov. 28, 2008.
European Search Report corresponding to EP 09 25 2035, mailed Mar. 9, 2010, 5 pages.

* cited by examiner

*Primary Examiner* — Lan-Dai T Truong
(74) *Attorney, Agent, or Firm* — Harrity & Harrity, LLP

(57) ABSTRACT

A network device connects between a client and a server. The network device is configured to store information regarding a capability of the server; receive a first message, from the client, intended for the server; obtain the stored information regarding the capability of the server; generate a second message that includes the information regarding the capability of the server; send the second message to the client; receive a third message from the client; and establish, based on the third message, a connection between the client and the server.

21 Claims, 12 Drawing Sheets

| BIT OFFSET | BITS 0-3 | BITS 4-7 | BITS 8-15 | BITS 16-31 |
|---|---|---|---|---|
| 0 | SOURCE PORT | | | DESTINATION PORT |
| 32 | SEQUENCE NUMBER | | | |
| 64 | ACKNOWLEDGMENT NUMBER | | | |
| 96 | DATA OFFSET | RES | FLAGS | WINDOW SIZE |
| 128 | CHECKSUM | | | URGENT POINTER |
| 160 | OPTIONS | | | |
| 160/192+ | DATA | | | |

TCP MESSAGE

FIG. 2A

USING A SERVER'S CAPABILITY PROFILE TO ESTABLISH A CONNECTION

BACKGROUND

Servers that provide Transmission Control Protocol (TCP) services are often susceptible to various types of Denial of Service (DoS) attacks from external hosts on the network. In one particular type of attack, known as a "synchronization (SYN) flood," external hosts attempt to overwhelm the server by sending a constant stream of TCP connection requests to the server, which forces the server to allocate resources for each new connection until all of the server's resources are exhausted.

Firewalls are often used to protect servers from being susceptible to a SYN flood attack. One technique that firewalls use to protect servers is called a "SYN cookie." For each incoming synchronization (SYN) message, the firewall replies with a SYN+ACK message with a particular signature in an Initial Sequence Number (ISN) (called a SYN cookie). The firewall will permit a TCP connection request to proceed to the server only if the ACK message that the firewall receives from the client contains the correct signature. Therefore, if the initial SYN message is part of an attack from a spoofed Internet Protocol (IP) address, it is unlikely that the ACK message from the client will contain the correct signature. As a result, the firewall will not permit the TCP connection to reach the server, thereby shielding the server from the attacker.

SUMMARY

According to one implementation, a network device may connect between a client and a server. The network device may include a memory to store a number of records, where one of the records may include information regarding a capability of the server. The network device may also include a processor, connected to the memory, to receive a first message, from the client, intended for the server, access the memory, in response to the first message, to obtain the information regarding the capability of the server, generate a second message that includes the information regarding the capability of the server, send the second message to the client, receive a third message from the client, and establish, based on the third message, a connection between the client and the server.

According to another implementation, a method may include storing, in a memory, information regarding a capability of a server; intercepting, from a client and over a network, a synchronization (SYN) message intended for the server; identifying, from the memory, the information regarding the capability of the server; generating a SYN+acknowledgment (ACK) (SYN+ACK) message that includes the information regarding the capability of the server; transmitting the SYN+ACK message to the client; receiving an ACK message from the client over the network; and determining whether to establish the connection between the client and the server based on the received ACK message.

According to a further implementation, a network device, connected between a client and a server, may include means for monitoring information provided by the server during a three-way handshake; means for storing the information as information regarding a capability of the server; means for receiving, from the client, a request to establish a connection with the server; means for performing, on behalf of the server, a three-way handshake with the client, where the information regarding the capability of the server is provided during the three-way handshake; means for performing a three-way handshake with the server when the three-way handshake with the client is successful; and means for establishing the connection between the client and the server when the three-way handshake with the server is successful.

BRIEF DESCRIPTION OF THE DRAWINGS

The accompanying drawings, which are incorporated in and constitute a part of this specification, illustrate one or more embodiments described herein and, together with the description, explain these embodiments. In the drawings:

FIGS. 2A-2C are diagrams of exemplary fields of a TCP message;

DETAILED DESCRIPTION

The following detailed description refers to the accompanying drawings. The same reference numbers in different drawings may identify the same or similar elements.

Overview

Implementations, described herein, may facilitate a data connection between a client and a server while protecting the server from attacks. These implementations will be described in terms of a TCP connection—though the description may apply to connections established using other types of protocols, such as User Datagram Protocol (UDP).

To facilitate an understanding of the description herein, it may be beneficial to generally describe the establishment of a TCP connection between a client and a server via a firewall. During establishment of a TCP connection, the firewall may operate in one of two modes depending, for example, on the number of connections sought with the server. The first mode is referred to herein as a "normal mode" in which TCP connections are established freely with the server. The second mode is referred to herein as an "attack mode" in which TCP connections are scrutinized before establishing the connections with the server.

Figure 1:
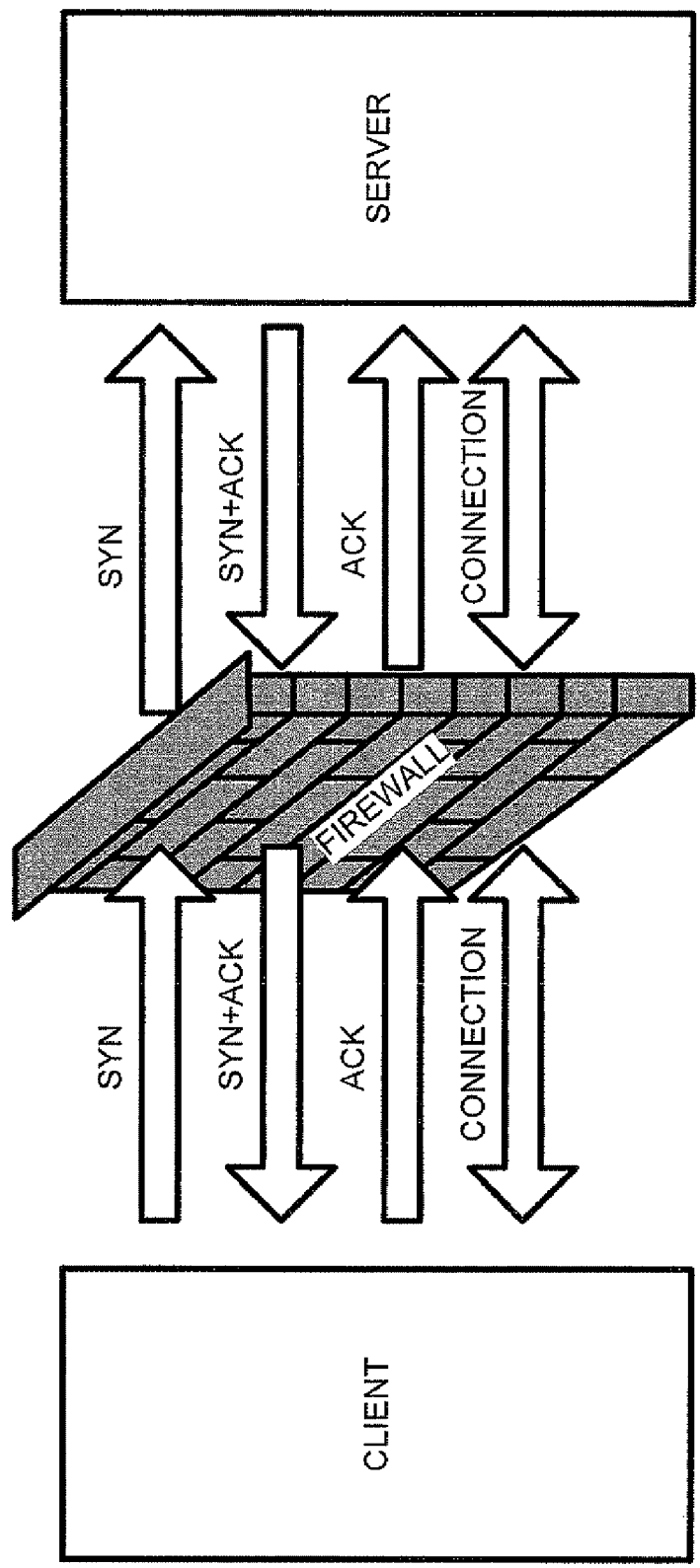
FIG. 1 is a diagram illustrating an example of setting up a TCP connection during a normal mode.

FIG. 1 is a diagram illustrating an example of setting up a TCP connection during the normal mode. As shown in FIG. 1, assume that a client wants to establish a TCP connection with a server. The client may initiate a TCP connection by sending, to the server, a synchronization (SYN) message that includes a sequence number set to a random number x. The firewall may intercept the SYN message and forward the SYN message to the server. The server may record the sequence number x and reply with an acknowledgment (ACK) and SYN message (SYN+ACK). The ACK may include the next sequence number that the server expects to receive from the client (e.g., x+1). The SYN, from the server, may include its own sequence number y. The firewall may intercept the SYN+ACK message and forward the SYN+ACK message to the client. The client may respond to the SYN+ACK message with an ACK message that includes the next sequence number x+1, and an acknowledgment number of y+1. The firewall may intercept the ACK message and forward the ACK message to the server. The combination of the SYN, SYN+ACK, and ACK is commonly referred to as a "three-way handshake." The three-way handshake is used to establish a TCP connection between the client and the server.

Figure 2B:
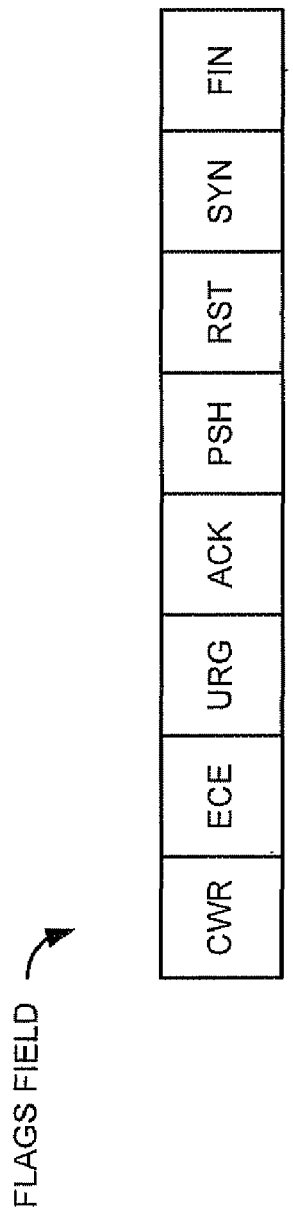
Figure 2C:
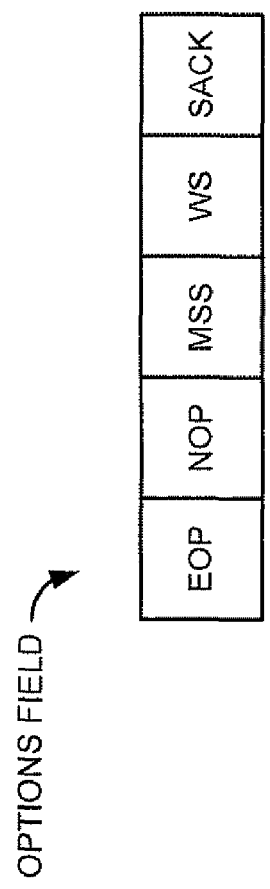

FIGS. 2A-2C are diagrams of exemplary fields of a TCP message. As shown in FIG. 2A, a TCP message may include a source port field, a destination port field, a sequence number field, an acknowledgement number field, a data offset field, a reserved (RES) field, a flags field, a window size field, a checksum field, an urgent pointer field, an options field, and a data field.

The source port field may identify the sending port. The destination port field may identify the receiving port. The sequence number field may have two roles depending on whether a SYN flag (identified below) is present. When the SYN flag is present, the sequence number field may store an initial sequence number (ISN). When the SYN flag is not present, the sequence number field may store the sequence number for the first data byte. The acknowledgement number field may identify the next expected byte that the receiver is expecting. The data offset field may specify the size of the TCP header and, thus, the start of the TCP data field. The reserved (RES) field is reserved for future use.

The flags field may store eight one bit control flags. As shown in FIG. 2B, the flags field may include a congestion window reduced (CWR) field, an ECN-Echo (ECE) field, an urgent (URG) field, an acknowledgment (ACK) field, a push (PSH) field, a reset (RST) field, a synchronize (SYN) field, and a finish (FIN) field. The CWR field may store a flag that may be set by the sender to indicate that the sender received a TCP message with the ECE flag set. The ECE field may store a flag that may indicate whether the sender/receiver is ECN capable. The URG field may store a flag that indicates whether the urgent pointer field is valid. The ACK field may store a flag that indicates whether the acknowledgment number field is valid. The PSH field may store a flag that indicates to the receiver that the receiver should push all of the buffered data to the receiving application. The RST field may store a flag that indicates to the receiver whether the connection is to be reset. The SYN field may store a flag that is set for initial messages of a TCP connection where both the receiver and the sender have to synchronize their buffers. The FIN field may store a flag that indicates that the sender will not be sending any more data.

Returning to FIG. 2A, the window size field may identify the number of bytes (beyond the sequence number in the acknowledgment field) that the receiver is currently willing to receive. The checksum field may include data for error-checking of the TCP header and the TCP data. The urgent pointer field may include an offset from the sequence number indicating the last urgent data byte.

The options field may include information regarding various TCP options. As shown in FIG. 2C, the options field may include an end of options (EOP) field, a no operations (NOP) field, a maximum segment size (MSS) field, a window scale (WS) field, and a selective acknowledgment (SACK) field. The EOP field may store data to indicate the end of the options. The NOP field may be used as padding. The MSS field may store data that specifies the maximum message size that the sender would like to receive. The SACK field may store data that indicates whether selective acknowledgments are permitted.

Returning to FIG. 2A, the data field may store the payload, or data portion, of the TCP message. The payload may be any of a number of application layer protocols, such as Hypertext Transfer Protocol (HTTP), Telnet, Secure Shell (SSH), and File Transfer Protocol (FTP).

Figure 3:
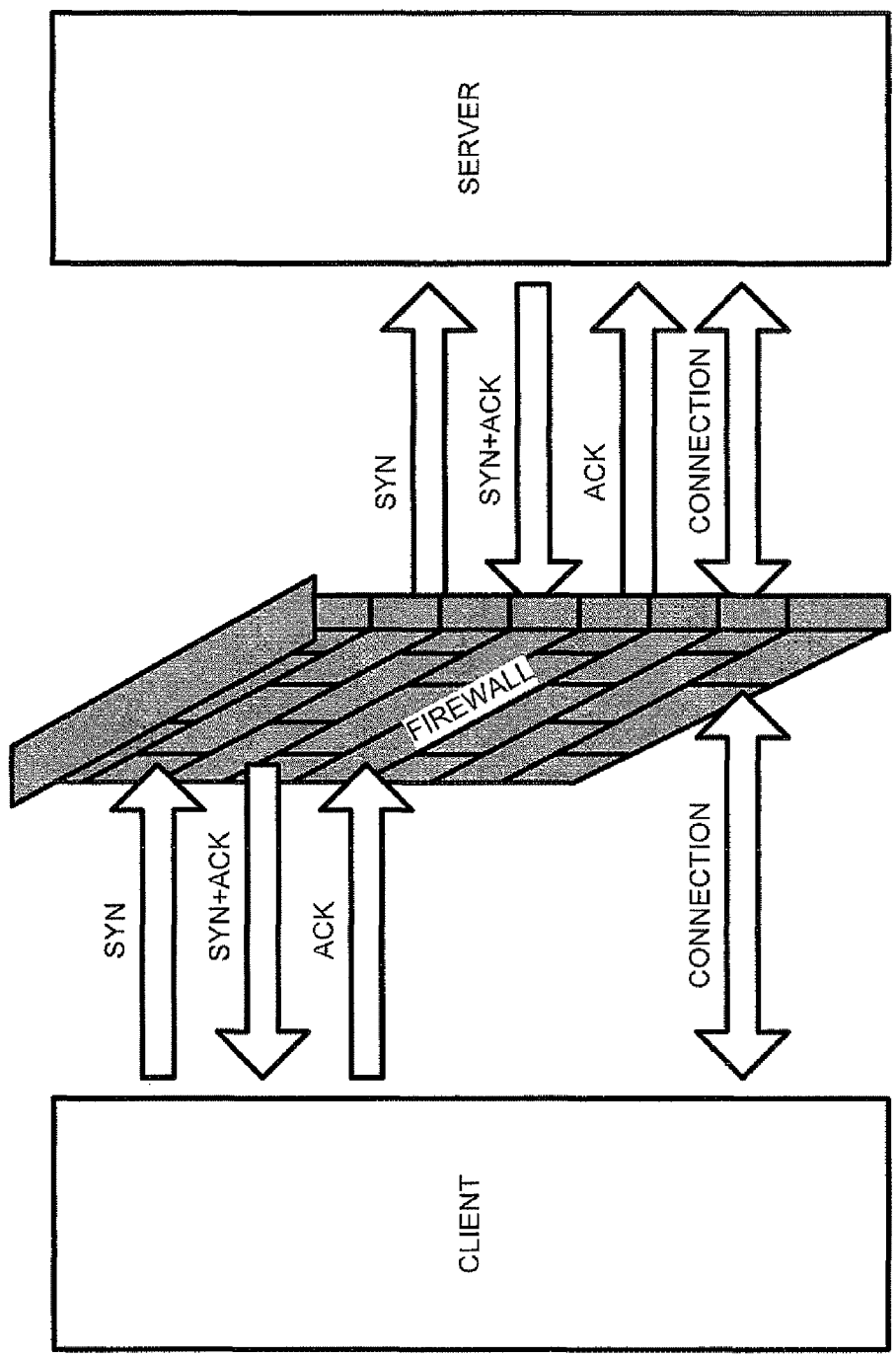
FIG. 3 is a diagram illustrating an example of setting up a TCP connection during an attack mode.

FIG. 3 is a diagram illustrating an example of setting up a TCP connection during an attack mode. As shown in FIG. 3, assume that a client wants to communicate with a server. The client may initiate a TCP connection by sending, to the server, a SYN message that includes a sequence number set to a random number x. The firewall may intercept the SYN message and store the random number x. The firewall may initiate a SYN cookie process to calculate a particular signature for the initial sequence number (ISN). The firewall may generate a SYN+ACK message that includes the particular signature as the ISN, and may send the SYN+ACK message to the client. The client may respond to the SYN+ACK message with an ACK message that includes the next sequence number x+1, and an acknowledgment number of ISN+1.

The firewall may intercept the ACK message and analyze the ACK message to determine whether the ACK message includes the correct sequence and acknowledgment numbers. If these numbers are what the firewall expected to receive, the firewall may initiate a TCP connection with the server by sending, to the server, a SYN message that includes a sequence number set to a random number x. The server may receive the SYN message and store the random number x. The server may reply to the SYN message with a SYN+ACK message. The ACK may include the next sequence number that the server expects to receive (e.g., x+1). The SYN, from the server, may include its own sequence number y. The firewall may receive the SYN+ACK message and respond to the SYN+ACK message with an ACK message that includes the next sequence number x+1, and an acknowledgment number of y+1. As a result of this three-way handshake, a TCP connection may be established between the client and the server.

During the three-way handshake, the client expects to receive information regarding the capabilities of the server so that the client does not send data that the server is incapable of handling. If the server receives data that the server is incapable of handling, the server may deny or drop the TCP connection. Thus, it would be beneficial for the firewall to convey to the client, on behalf of the server, the capabilities of the server during the three-way handshake.

Existing firewalls reply to client SYN messages, on behalf of the servers, without knowing the capabilities of the servers that the firewalls protect. The best that existing firewalls can do is to blindly turn down all of the values proposed by the clients and reply with minimum values in the SYN+ACK messages. This may cause problems during the communications between the clients and the servers. The problems can be classified into two categories: (1) critical problems, where critical values (e.g., MSS) will cause communication failures between the clients and servers; and (2) non-critical problems, where non-critical values (e.g., SACK and WS) may affect communication performance.

Implementations, described herein, may accumulate information, within a firewall, regarding the capabilities of the server(s) that the firewall protects. As a result, the firewall may include information regarding a server's capabilities in the three-way handshake with a client seeking to establish a TCP connection with the server. So when the client later communicates with the server, the client may send only that data that the server is capable of handling.

Exemplary Environment

Figure 4:
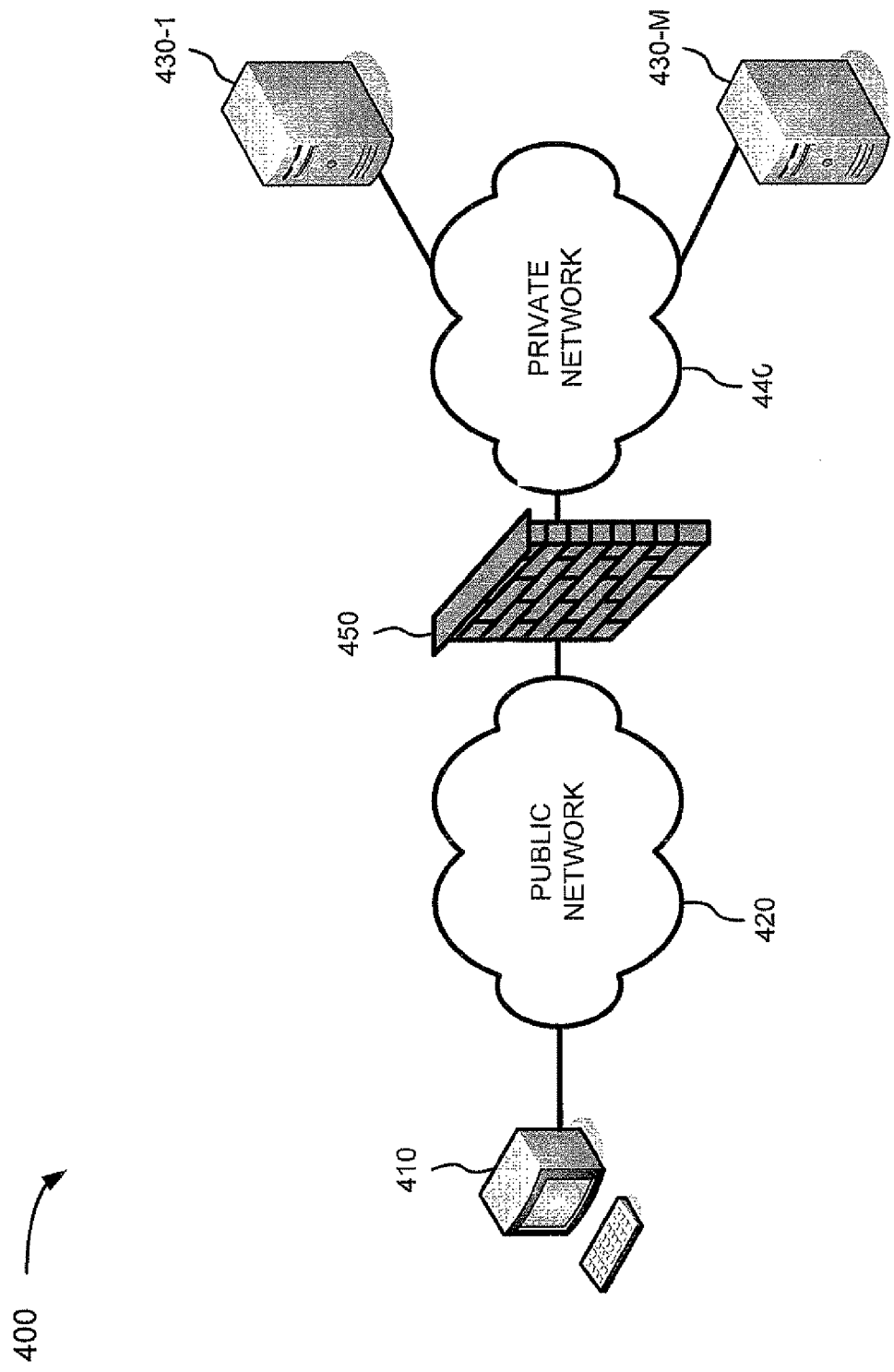
FIG. 4 is a diagram of an exemplary environment in which systems and methods, described herein, may be implemented.

FIG. 4 is a diagram of an exemplary environment 400 in which systems and methods, described herein, may be implemented. Environment 400 may include a client 410 connected to a public network 420, servers 430-1, . . . , 430-M (where M≧1) (referred to collectively as "servers 430," and individually as "server 430") connected to a private network 440, and a firewall 450. While FIG. 4 shows a particular number and arrangement of devices, environment 400 may include additional, fewer, different, and/or differently arranged devices in other implementations.

Client 410 may include a computing or communication device of an end-user, such as a desktop computer, a laptop, or a mobile communication device (e.g., a mobile phone or a personal digital assistant (PDA)). Public network 420 may include a wide area network (WAN) (e.g., the Internet), a local area network (LAN), a metropolitan area network (MAN), or a combination of networks. Client 410 may connect to public network 420 via wired and/or wireless connection(s).

Servers 430 may include computing or communication devices, such as stationary or mobile computing devices. Servers 430 may execute a number of server applications that service client requests. Private network 440 may include a LAN or a WAN. Access to private network 440 may be restricted. Servers 430 may connect to private network 440 via wired and/or wireless connection(s).

Firewall 450 may include a network device that provides security measures on behalf of private network 440. For example, firewall 450 may control access to private network 440 and, thus, the resources of private network 440 (e.g., servers 430). In one implementation, firewall 450 may act as a proxy for servers 430. Firewall 450 may connect to public network 420 and private network 440 via wired and/or wireless connection(s).

Firewall 450 may prevent devices from accessing servers 430 without permission (e.g., authentication and authorization). To do this, data units (e.g., packets) going to and from servers 430 may pass through firewall 450. Firewall 450 may enforce rules that define which data units may pass through firewall 450 (e.g., in one or both directions). For example, firewall 450 may compare a received data unit to a criterion or criteria, which may define a rule, to determine whether the data unit may be forwarded to its destination, forwarded to a different destination, or dropped. Comparisons to criteria, for example, may include comparing a received data unit's source and destination address, source and destination port number, and/or protocol type to a table of allowed source and destination addresses, source and destination port numbers, and/or protocol types. By performing this comparison, firewall 450 may help protect servers 430 from malicious traffic or from unauthorized and/or unauthenticated clients. Besides forwarding or dropping data units, firewall 450 may perform other functions on data units, such as monitoring data units to police client bandwidth, to gather information regarding the capabilities of servers 430, etc.

Figure 5:
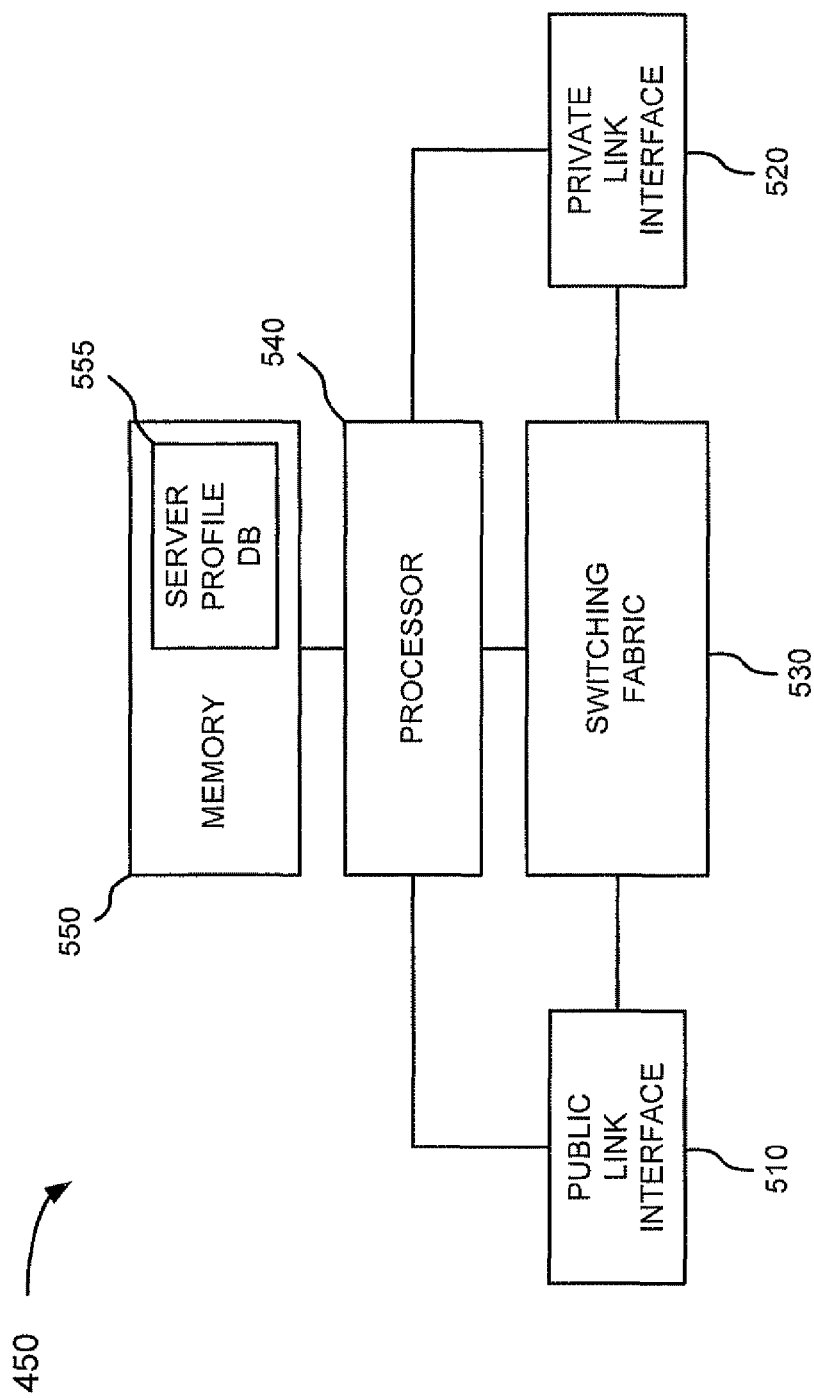
FIG. 5 is a diagram of exemplary components of the firewall of FIG. 4.

FIG. 5 is a diagram of exemplary components of firewall 450. As shown in FIG. 5, firewall 450 may include a public link interface 510, a private link interface 520, a switching fabric 530, a processor 540, and a memory 550. In another implementation, firewall 450 may include additional, fewer, different, or differently arranged components than are shown in FIG. 5.

Public link interface 510 may include an interface to public network 420. Public link interface 510 may include components for processing and/or buffering data units received from public network 420 or for transmission to public network 420. Private link interface 520 may include an interface to private network 440. Private link interface 520 may include components for processing and/or buffering data units received from private network 440 or for transmission to private network 440. In one implementation, each of public link interface 510 and private link interface 520 may connect to a set of Ethernet links.

Switching fabric 530 may include a switching plane that may facilitate the transmission of data units to/from public link interface 510 from/to private link interface 520. For example, switching fabric 530 may include a crossbar switch. In another implementation, switching fabric 530 may include a memory device. In this case, data units, received by public link interface 510, may be stored in the memory device and read from the memory device for transmission by private link interface 520, and vice versa.

Processor 540 may include a processor, a microprocessor, or processing logic (e.g., an application specific integrated circuit (ASIC) or a field programmable gate array (FPGA)) that may interpret and execute instructions. Processor 540 may process data units using, for example, a set of rules that may be stored in memory 550.

Memory 550 may include a random access memory (RAM) or another type of dynamic storage device that may store information and instructions for execution by processor 540; a read only memory (ROM) or another type of static storage device that may store static information and instructions for use by processor 540; and/or a removable memory, such as a flash memory. In one implementation, memory 550 may store a set of rules that may be executed by processor 540 to determine whether to permit a client to access private network 440.

Figure 6:
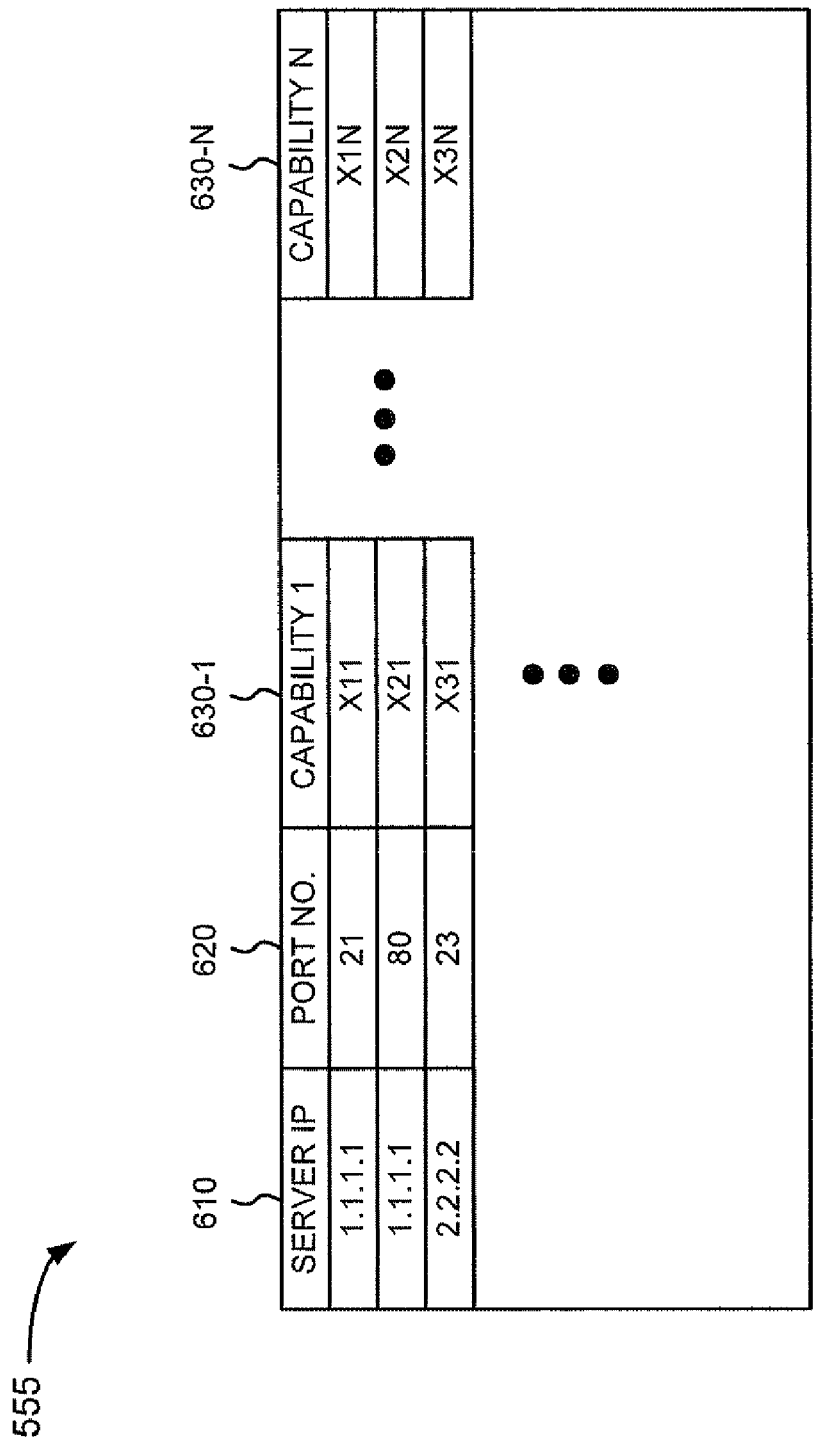
FIG. 6 is a diagram of exemplary records within the server profile database of FIG. 5.

Memory 550 may include a server profile database 555. Server profile database 555 may store information regarding the capabilities of servers 430. FIG. 6 is a diagram of exemplary records within server profile database 555. As shown in FIG. 6, server profile database 555 may include a number of records. Each of the records may correspond to a different application that may be operating upon a server 430. A record may include a server IP address field 610, a port number field 620, and capability fields 630-1, . . . , 630-N (N>1) (collectively referred to as "capability fields 630," and individually as "capability field 630"). In another implementation, server profile database 555 may include additional, fewer, or different fields than are shown in FIG. 6.

Server IP address field 610 may store data associated with an IP address corresponding to server 430. Port number field 620 may store data associated with a port number corresponding to a port of server 430. The combination of server IP address field 610 and port number field 620 may uniquely identify an application executed on server 430.

Capability field 630 may store information on a capability of the server application identified by server IP address field 610 and port number field 620. A "capability," as used herein, may refer to a value that a server may set for a communication with a client. For example, in one implementation, a capability may refer to a value that may be set in a three-way handshake, such as a MSS value that may be set in the MSS field of a TCP message, a window scale value that may be set in the WS field of a TCP message, a selective acknowledgment value that may be set in the SACK field of a TCP message, and/or a window size value that may be set in the window size field of a TCP message. In another implementation, a capability may refer to a value that may be set in another field of a TCP message.

Exemplary Firewall Operating Modes

Figure 7:
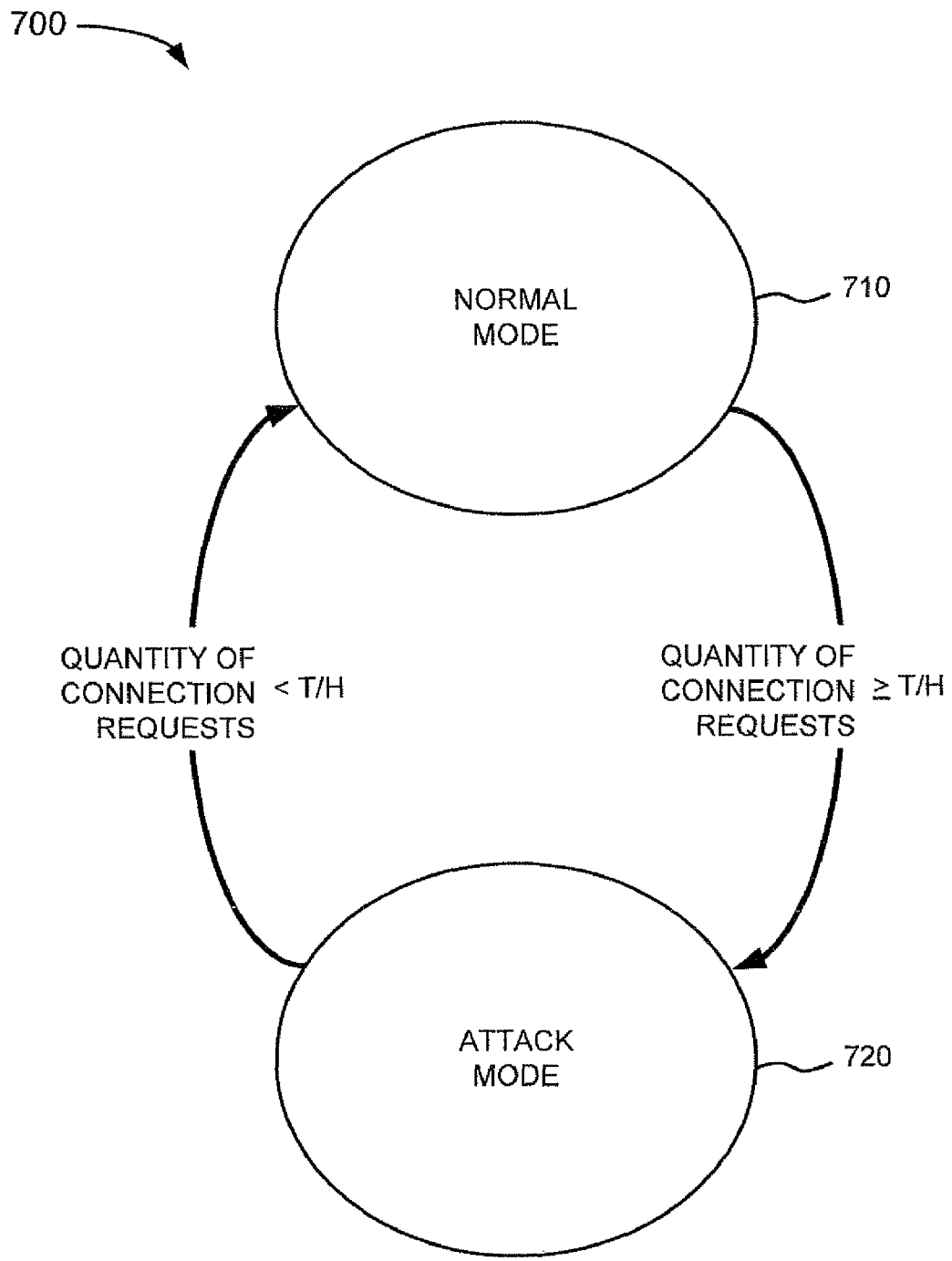
FIG. 7 is a diagram illustrating exemplary modes in which the firewall of FIG. 4 can operate.

FIG. 7 is a diagram illustrating exemplary modes in which firewall 450 can operate. As shown in FIG. 7, firewall 450 may operate in a normal mode 710 or an attack mode 720. Firewall 450 may transition between normal mode 710 and attack mode 720. One factor that may be used, by firewall 450, to determine in which mode to operate may be based on the quantity of connection requests received for a particular server application in a period of time. A threshold (T/H) may be set, per server 430 (or server application), that may indicate the quantity of connection requests that server 430 (or server application) permits per second.

When the quantity of connection requests is less than the threshold value, firewall 450 may enter, or remain in, normal mode 710. Generally, in normal mode 710, firewall 450 may permit connection requests to pass between client 410 and server 430. Of course, firewall 450 may continue to take typical security measures (e.g., authentication and authorization) on received connection requests.

When the quantity of connection requests is greater than, or equal to, the threshold value, firewall 450 may enter, or remain in, attack mode 720. Generally, in attack mode 720, firewall 450 may initiate a SYN-cookie process, thereby increasing scrutiny on new connection requests.

Firewall 450 may make the decision of the mode in which to operate on a per server 450 (or per server application) basis. In other words, firewall 450 may operate within normal mode 710 with regard to one server 430 (or server application) and operate within attack mode 720 with regard to another server 430 (or server application). Thus, firewall 450 may concurrently operate within normal mode 710 and attack mode 720.

Normal Mode Operation

Figure 8:
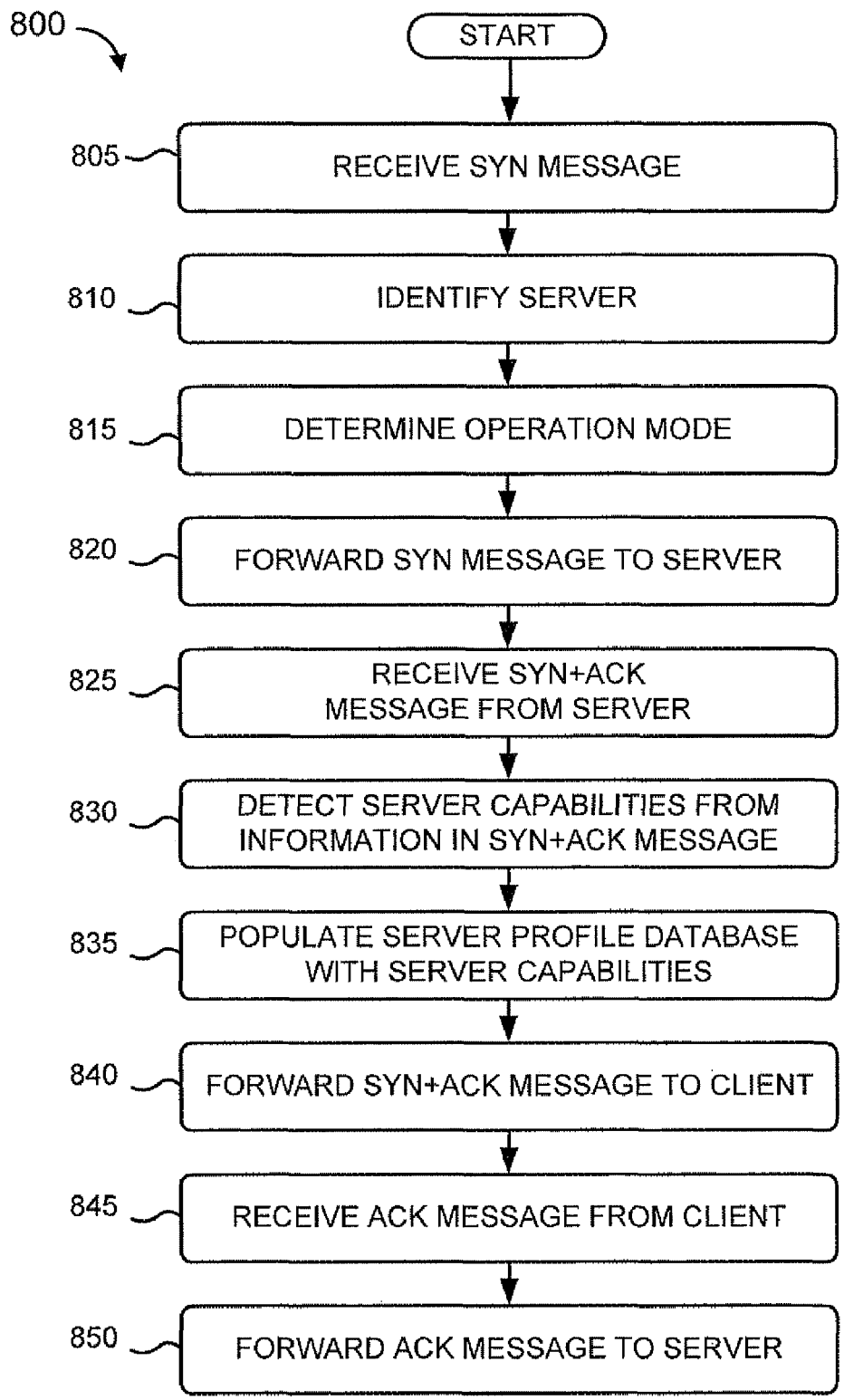
FIG. 8 provides a flowchart illustrating an exemplary process for establishing a connection in the normal mode.

FIG. 8 provides a flowchart illustrating an exemplary process 800 for establishing a connection in the normal mode. Process 800 may be performed by a firewall (e.g., firewall 450), a group of firewalls, or a device operating in conjunction with a firewall or a group of firewalls.

As shown in FIG. 8, process 800 may begin with a SYN message being received (block 805). For example, client 410 may generate a SYN message for establishing a TCP connection with server 430. Client 410 may send the SYN message to server 430. Firewall 450 may intercept the SYN message.

The server, to which the SYN message is intended, may be identified (block 810). For example, firewall 450 may process the SYN message to identify server 430 based on information in the header of the SYN message. In one implementation, firewall 450 may identify server 430 based on a destination address and/or port included in the SYN message. Firewall 450 may also perform security operations (e.g., authentication and authorization) on the SYN message. Firewall 450 may further determine that the SYN message is associated with a new TCP connection request, as opposed to an existing TCP connection request. Firewall 450 may make this determination by comparing certain information in the SYN message (or a hash of this information) to information in a table containing information associated with existing TCP connections.

If the SYN message is associated with a new TCP connection, the operation mode may be determined (block 815). For example, firewall 450 may determine whether the quantity of connection requests is less than a threshold value. If the quantity of connection requests is not less than the threshold value, firewall 450 may enter the attack mode (described with regard to FIGS. 9 and 10). If the quantity of connection requests is less than the threshold value, firewall 450 may remain in the normal mode and process 800 may continue as shown in FIG. 8. Assume, for the description to follow, that firewall 450 remains in the normal mode.

The SYN message may be forwarded to the server (block 820). For example, firewall 450 may send the SYN message to server 430 by outputting the SYN message on a link for transmission toward server 430.

A SYN+ACK message may be received from the server (block 825). For example, server 430 may generate a SYN+ACK message that includes information regarding the capabilities of server 430. In one implementation, the SYN+ACK message may include information in the MSS field, the WS field, the SACK field, and/or the window size field. The information in these fields may provide information regarding the capabilities of server 430. For example, if client 410 sends data that does not conform to one of the capabilities, server 430 may reject, or terminate, the connection. Server 430 may transmit the SYN+ACK message to client 410. Firewall 450 may intercept the SYN+ACK message.

Server capabilities may be detected from information in the SYN+ACK message (block 830). For example, firewall 450 may read information from the SYN+ACK message. In one implementation, firewall 450 may read information from the MSS field, the WS field, the SACK field, and/or the window size field of the SYN+ACK message.

Server profile database 555 may be populated with the server capabilities (block 835). For example, firewall 450 may use the information, read from the SYN+ACK message, to populate server profile database 555. If a record already exists in server profile database 555 for this particular server 430 (or server application), firewall 450 may update the information in the record with the information read from the SYN+ACK message. If no record exists in server profile database 555 for this particular server 430 (or server application), firewall 450 may create a record with the information read from the SYN+ACK message.

The SYN+ACK message may be forwarded to the client (block 840). For example, firewall 450 may send the SYN+ACK message to client 410 by outputting the SYN+ACK message on a link for transmission toward client 410.

An ACK message may be received from the client (block 845). For example, client 410, upon receiving the SYN+ACK message, may generate an ACK message with data conforming to the capabilities of server 430. Client 410 may transmit the ACK message to server 430. Firewall 450 may intercept the ACK message.

The ACK message may be forwarded to the server (block 850). For example, firewall 450 may send the ACK message to server 430 by outputting the ACK message on a link for transmission toward server 430. As a result, a TCP connection may be successfully established between client 410 and server 430.

In the implementation described above, it has been described that server profile database 555 is automatically populated by firewall 450 monitoring the messages exchanged between client 410 and server 430 during the three-way handshake. In another implementation, an operator of firewall 450 may manually populate server profile database 555. The operator, having knowledge of devices connected to private network 440, may know the capabilities of servers 430. Thus, the operator may input information regarding the capabilities of servers 430 in server profile database 555, and this information may remain static unless updated by the operator.

Attack Mode Operation

Figure 9:
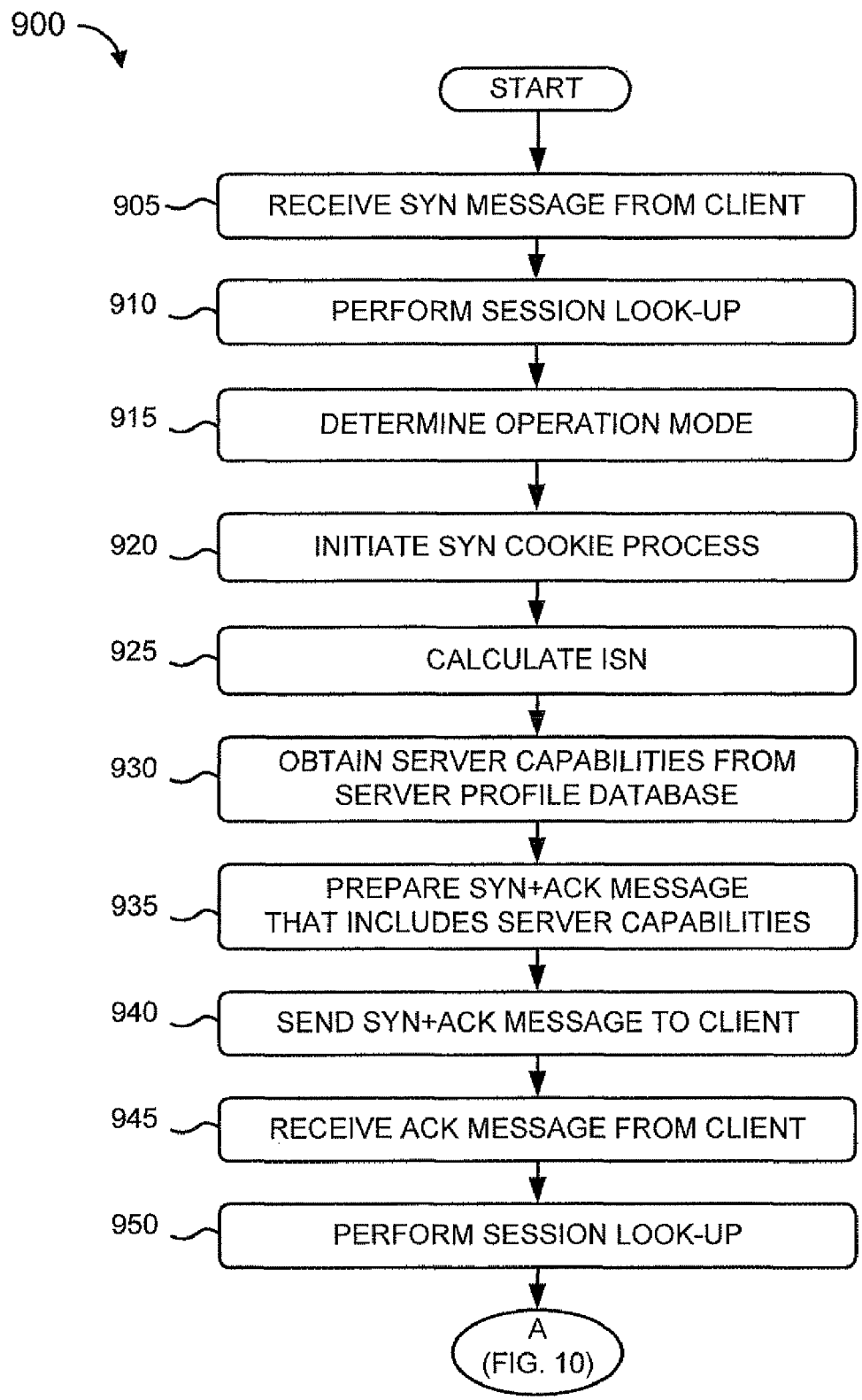
FIGS. 9 and 10 provide a flowchart illustrating an exemplary process for establishing a connection in the attack mode.
Figure 10:
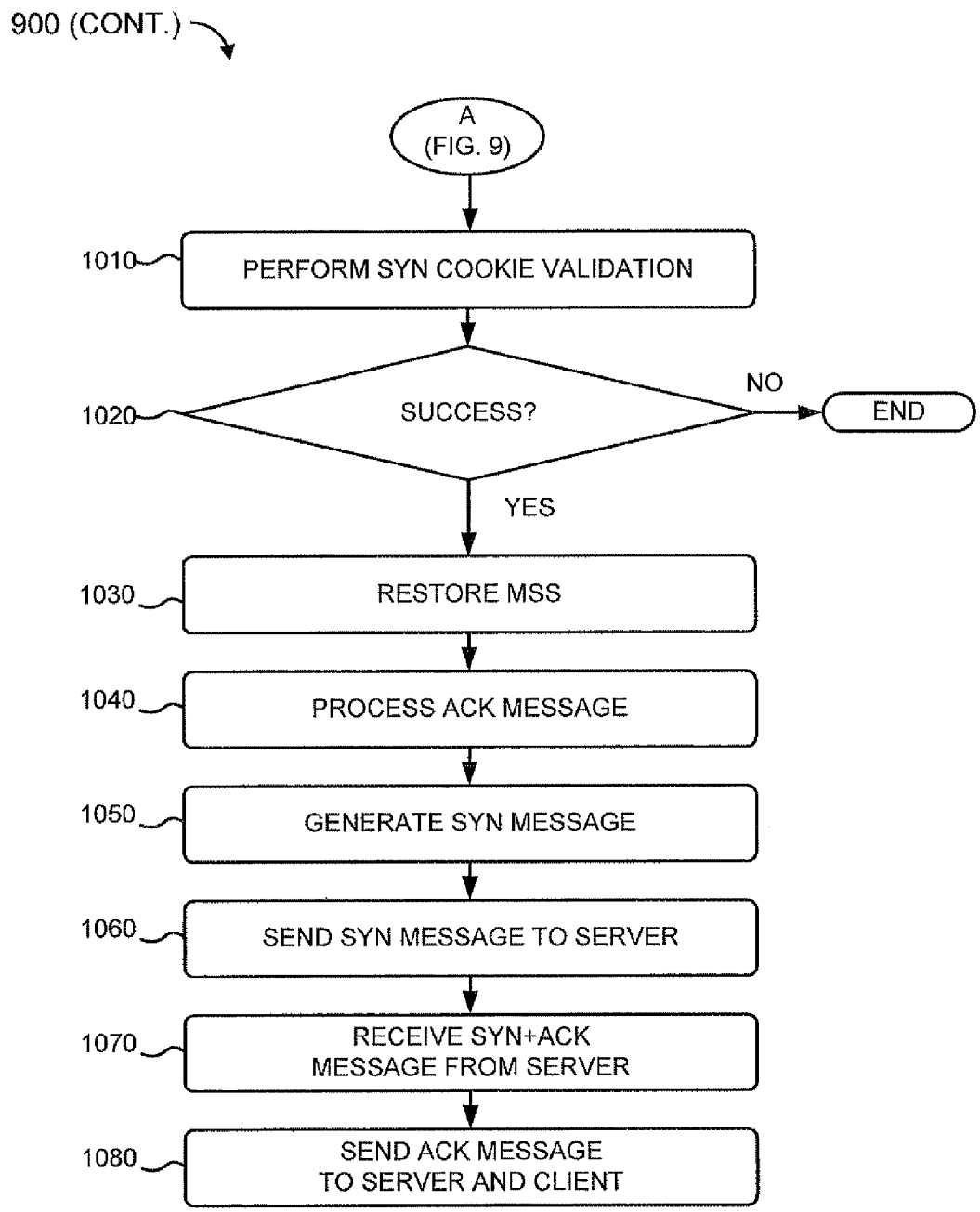

FIGS. 9 and 10 provide a flowchart illustrating an exemplary process 900 for establishing a connection in the attack mode. Process 900 may be performed by a firewall (e.g., firewall 450), a group of firewalls, or a device operating in conjunction with a firewall or a group of firewalls.

As shown in FIG. 9, process 900 may begin with a SYN message being received (block 905). For example, client 410 may generate a SYN message for establishing a TCP connection with server 430. Client 410 may send the SYN message to server 430. Firewall 450 may intercept the SYN message.

A session look-up may be performed (block 910). For example, firewall 450 may determine whether the SYN message is associated with a new TCP connection request, as opposed to an existing TCP connection request. Firewall 450 may make this determination by comparing certain information in the SYN message (or a hash of this information) to information in a table of information associated with existing TCP connections. If the SYN message is associated with an existing TCP connection, firewall 450 may forward the SYN message to server 430. If the SYN message is associated with a request for a new TCP connection, the process 900 may continue to block 920.

If the SYN message is associated with a new TCP connection, the operation mode may be determined (block 915). For example, firewall 450 may determine whether the quantity of connection requests is less than a threshold value. If the quantity of connection requests is less than the threshold value, firewall 450 may enter the normal mode (described with regard to FIG. 8). If the quantity of connection requests is not less than the threshold value, firewall 450 may remain in the attack mode and process 900 may continue as shown in FIGS. 9 and 10. Assume, for the description to follow, that firewall 450 remains in the attack mode.

A SYN cookie process may be initiated to calculate an initial sequence number (ISN) (blocks 920 and 925). For example, firewall 450 may generate a particular signature to use for the ISN in a SYN+ACK message. In one implementation, firewall 450 may generate the particular signature as follows: t mod 32, encoded value representing m, s. The variable t may represent a counter value that may be incremented every z seconds (e.g., 64 seconds). The variable m may represent a value corresponding to the client's maximum segment size (MSS). The variable s may represent a result of a cryptographic function computed over the server IP address and port number, the client IP address and port number, and the value t. In one implementation, the ISN may include five bits corresponding to the t mod 32 value, three bits that encode m, and twenty-four bits corresponding to s.

In another implementation, firewall 450 may generate the particular signature for the ISN in a different way. For example, firewall 450 may use information in a received message, such as the source IP address, a destination IP address, a source port number, a destination port number, and/or an ISN, to generate the particular signature. In one implementation, firewall 450 may generate the particular signature by hashing the information in the received message.

The server's capabilities may be obtained from server profile database 555 (block 930). For example, firewall 450 may use information regarding server 430 (e.g., information regarding the IP address and port number) to identify a record in server profile database 555. Within the identified record, firewall 450 may read the capabilities of server 430 from, for example, capability fields 630. For example, firewall 450 may determine values for the MSS field, the WS field, the SACK field, and/or the window size field of a SYN+ACK message.

A SYN+ACK message, that includes information regarding the server's capabilities, may be prepared (block 935). For example, firewall 450 may prepare a SYN+ACK message on behalf of server 430. Firewall 450 may include the values, which firewall 450 obtained from server profile database 555, in the appropriate fields of the SYN+ACK message.

The SYN+ACK message may be sent to the client (block 940). For example, firewall 450 may send the SYN+ACK message to client 410 by outputting the SYN+ACK message on a link for transmission toward client 410.

An ACK message may be received from the client (block 945). For example, client 410, upon receiving the SYN+ACK message, may generate an ACK message with data conforming to the capabilities of server 430, as provided by firewall 450 on behalf of server 430. Client 410 may transmit the ACK message to server 430. Firewall 450 may intercept the ACK message.

A session look-up may be performed (block 950). For example, firewall 450 may determine whether the ACK message is associated with a new TCP connection request, as opposed to an existing TCP connection request. Firewall 450 may make this determination by comparing certain information in the ACK message (or a hash of this information) to information in a table containing information associated with existing TCP connections. If the ACK message is associated with an existing TCP connection, firewall 450 may forward the ACK message to server 430. If the ACK message is associated with a request for a new TCP connection, the process 900 may continue to block 1010 (FIG. 10).

A SYN cookie validation may be performed (block 1010). For example, firewall 450 may analyze the ACK message from client 410 to determine whether the ACK message includes certain information that firewall 450 expects to receive from client 410. In one implementation, firewall 450 may analyze, for example, the acknowledgment number field to determine whether the field stores a value equal to ISN+1. If the acknowledgment number field stores a value other than ISN+1, then firewall 450 may determine that the SYN cookie validation failed (block 1020 NO). In this case, firewall 450 may deny the TCP connection request, thereby protecting server 430 from a potentially malicious connection request.

If the acknowledgment number field stores a value equal to ISN+1, then firewall 450 may determine that the SYN cookie validation succeeded (block 1020—YES). In this case, the value of MSS may be restored (block 1030). For example, firewall 450 may restore the value stored in the MSS field with the MSS value received from client 410. Firewall 450 may provide a MSS value to client 410 based on the capabilities of server 430, as known by firewall 450. Client 410 may provide an ACK message with another MSS value (e.g., a MSS value that conforms to the capabilities of server 430, but may not necessarily match the MSS value provided by firewall 450). Firewall 450 may record the MSS value from client 410.

The ACK message may be processed (block 1040). For example, firewall 450 may perform operations based on the ACK message, such as a routing operation, a policy look-up operation, a session set-up operation, a layer 2 resolve operation, or the like. Provided that these operations are performed favorably, process 900 may continue to block 1050.

A SYN message may be generated (block 1050). For example, firewall 450 may generate a SYN message and include, in the SYN message, information that firewall 450 obtained through the three-way handshake that firewall 450 performed with client 410. In one implementation, the SYN message may include information regarding client 410 to appear as if the SYN message was sent from client 410.

The SYN message may be sent to the server (block 1060). For example, firewall 450 may send the SYN message to server 430 by outputting the SYN message on a link for transmission toward server 430.

A SYN+ACK message may be received from the server (block 1070). For example, server 430 may, upon receiving the SYN message, generate a SYN+ACK message that server 430 may send to client 410. Firewall 450 may intercept the SYN+ACK message. Receipt of the SYN+ACK from server 430 may indicate that server 430 has accepted the connection.

An ACK message may be sent to both the server and the client (block 1080). For example, upon receipt of the SYN+ACK message, firewall 450 may generate an ACK message that firewall 450 may send to both server 430 and client 410 to complete the TCP connection set-up.

Example

Figure 11:
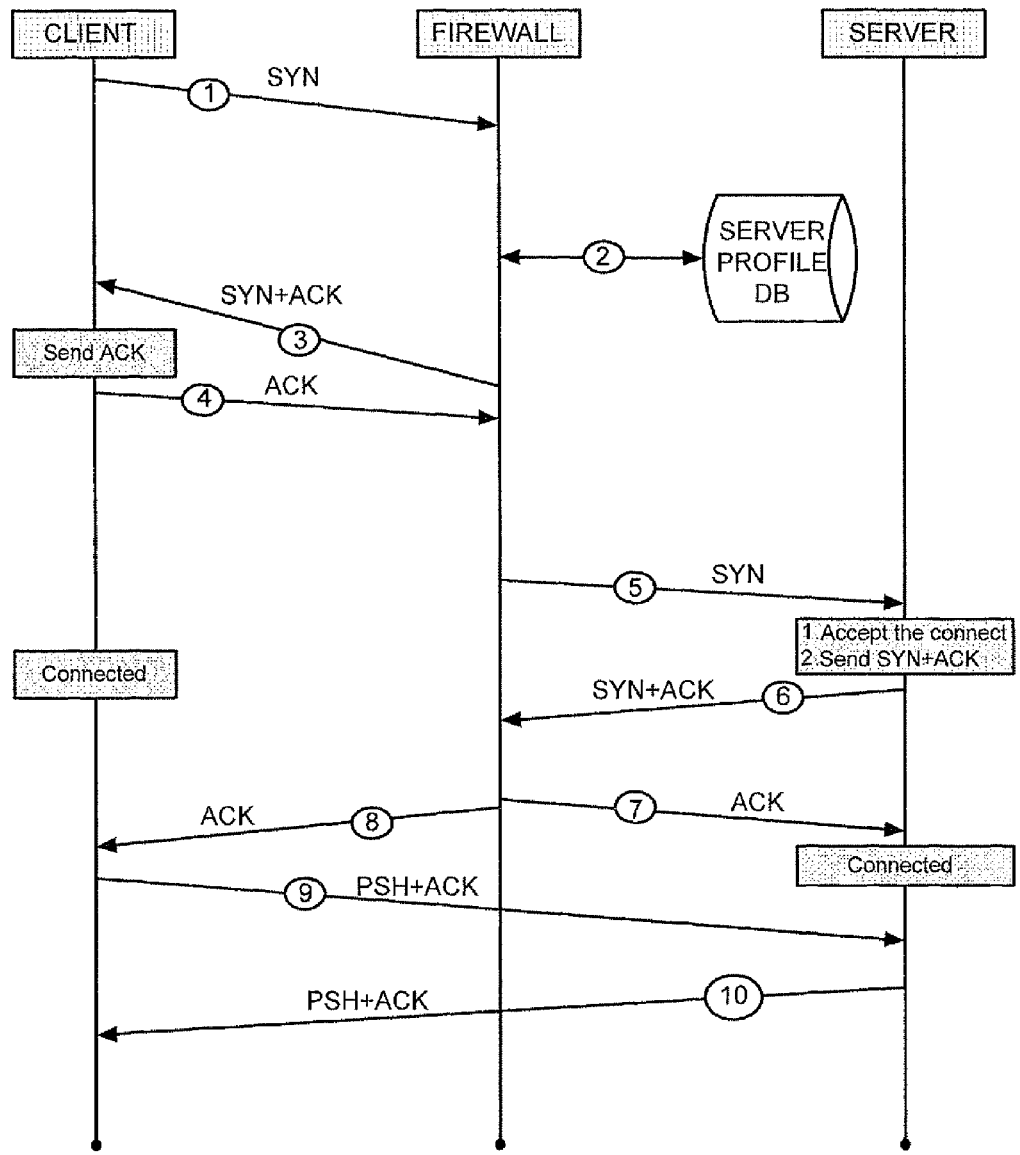
FIG. 11 is a diagram illustrating an example of establishing a TCP connection.

FIG. 11 is a diagram illustrating an example of establishing a TCP connection between a client and a server. As shown in FIG. 11, assume that a client desires to establish a TCP connection with a server, and the server is protected by a firewall. Assume also that the quantity of connection requests to the server exceeds a threshold, so the firewall enters the attack mode.

The client may generate a SYN message and transmit the SYN message to the server (as shown at (1)). The SYN message may be intercepted by the firewall. The firewall may perform a session look-up and determine that the SYN message is associated with a request for a new TCP connection. The firewall may initiate a SYN cookie operation to generate a particular signature for the ISN. The firewall may also perform a server profile database look-up to identify the capabilities of the server (as shown at (2)). The firewall may generate a SYN+ACK message that includes the ISN and information regarding the server's capabilities, and transmit the SYN+ACK message to the client (as shown at (3)).

The client may receive the SYN+ACK and generate an ACK message. The client may send the ACK message to the server (as shown at (4)). The ACK message may be intercepted by the firewall. The firewall may process the ACK message to determine whether the SYN cookie validation process succeeds. Assume that the SYN cookie validation process succeeds.

The firewall may generate a SYN message that the firewall may send to the server (as shown at (5)). The server may receive the SYN message from the firewall. Assume that the server accepts the connection request. As a result, the server may generate a SYN+ACK message that the server may send to the client. The SYN+ACK message may be intercepted by the firewall (as shown at (6)).

The firewall may process the SYN+ACK message and generate an ACK message. The firewall may send the ACK message to both the server (as shown at (7)) and the client (as shown at (8)). The client may receive the ACK message from the firewall and generate a push (PSH)+ACK message (e.g., a data message containing an acknowledgment). The client may send the PSH+ACK message to the server (as shown at (9)). The PSH+ACK message may be intercepted and forwarded, to the server, by the firewall.

The server may receive the PSH+ACK message from the client (via the firewall) and generate a PSH+ACK message of its own. The server may send the PSH+ACK message to the client (as shown at (10)). The PSH+ACK message may be intercepted and forwarded, to the client, by the firewall.

CONCLUSION

Implementations, described herein, may improve TCP communications during an attack mode of a firewall. When performing a three-way handshake with a client, the firewall may use information that the firewall has obtained regarding the capabilities of a server. As a result, when the client sends data to the server, the client can conform to the capabilities of the server, thereby reducing the chance that the server will deny or drop the connection.

The foregoing description provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 8-10, the order of the blocks may be modified in other implementations. Further, non-dependent blocks may be performed in parallel.

Also, reference was made throughout the description to the capabilities of the server. These references may refer to the capabilities of an application operating on the server. Likewise, any reference to the capabilities of an application operating on the server may refer to the capabilities of the server itself.

Further, while the terms "client" and "server" have been used to refer to devices, these terms may also refer to applications operating on these devices. The terms "client device" and "server device" are intended to refer to devices and not to applications operating on these devices.

It will be apparent that aspects described herein may be implemented in many different forms of software, firmware, and hardware in the implementations illustrated in the figures. The actual software code or specialized control hardware used to implement these aspects does not limit the embodiments described herein. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A network device connected between a client and a server, the network device comprising:
a memory to store a plurality of records, one of the records including information associated with a capability of the server; and
a processor, connected to the memory, to:

determine, based on communication between the server and the client and during a first mode of operation of the network device, the information regarding the capability of the server, receive a synchronization (SYN) message, from the client, intended for the server, determine, based on receiving the SYN message, whether the network device comprises the first mode of operation or a second mode of operation, forward, when the network device comprises the first mode of operation, the SYN message to the server, when the network device comprises the second mode of operation, the processor being to:

access the memory to obtain the information associated with the capability of the server based on receiving the SYN message, generate a SYN+acknowledgment (ACK) (SYN+ACK) message that includes the obtained information associated with the capability of the server, send the SYN+ACK message to the client, receive an ACK message from the client, determine whether the ACK message includes expected information that is based on the SYN+ACK message, and establish a connection between the client and the server when the ACK message includes the expected information.

2. The network device of claim 1, where the information, stored in the memory, associated with the capability of the server includes a value associated with at least one of a maximum segment size, a window scale size, a selective acknowledgment, or a window size.

3. The network device of claim 1, where, when determining the information associated with the capability of the server, the processor is to:

monitor the communication between the server and a client, and store the information associated with the capability of the server in the memory.

4. The network device of claim 1, where the network device is a firewall connected between the client and the server.

5. The network device of claim 1, when establishing the connection between the client and the server, the processor is to:

send a fourth message to the server, receive a fifth message from the server, and send a sixth message to the server and to the client to establish the connection.

6. The network device of claim 5, where the fourth message is a SYN message, the fifth message is a SYN+ACK message, and the sixth message is an ACK message.

7. The network device of claim 1, where the network device is connected to a plurality of servers, each of the records, in the memory, storing information associated with a capability of one of the plurality of servers.

8. The network device of claim 1, where, when the network device comprises the second mode of operation, the processor is further to:

identify a sequence number that is included in the SYN message, generate a signature from information associated with at least one of the client or the server, store the signature as an initial sequence number in the SYN+ACK message, and when determining whether the ACK message includes the expected information, the processor being to:

determine, based on the identified sequence number and the generated signature, whether the ACK message includes a particular sequence number and a particular acknowledgement number.

9. The network device of claim 1, where the SYN+ACK message includes a first sequence number, and when determining whether the ACK message includes the expected information, the processor being to:

determine whether the ACK message includes a second sequence number that is immediately subsequent to the first sequence number.

10. The network device of claim 1, when the network device comprises the second mode of operation, the processor is further to:

calculate a signature based on the SYN message, the calculated signature being included in the SYN+ACK message, and when determining whether the ACK message includes the expected information, the processor being to:

determine whether the ACK message includes an acknowledgement number that is based on the calculated signature.

11. A method, comprising:

determining, during a first mode of operation, information associated with a capability of a server;

intercepting, from a client and over a network, a synchronization (SYN) message intended for the server;

determining, based on intercepting the SYN message, whether the SYN message was intercepted during a second mode of operation;

forwarding, when the SYN message was intercepted during the first mode of operation, the SYN message to the server;

identifying, when the SYN message was intercepted during the second mode of operation, the information associated with the capability of the server;

generating a SYN+acknowledgment (ACK) (SYN+ACK) message that includes the information associated with the capability of the server;

transmitting the SYN+ACK message to the client;

receiving an ACK message from the client over the network; and determining whether to establish a connection between the client and the server based on the ACK message, the determining including:

determining whether the ACK message includes expected information that is based on the SYN+ACK message.

12. The method of claim 11, further comprising:

storing the information associated with the capability of the server, the storing the information associated with the capability of the server including storing a value associated with at least one of a maximum segment size, a window scale size, a selective acknowledgment, or a window size.

13. The method of claim 11, further comprising:

monitoring communication from the server, the communication including the information associated with the capability of the server.

14. The method of claim 11, where the method is performed by a firewall connected between the client and the server.

15. The method of claim 11, further comprising:

transmitting, based on determining that the connection should be established between the client and the server, a second SYN message to the server;

receiving, based on transmitting the second SYN message, a second SYN+ACK message from the server; and transmitting a second ACK message to the server to establish the connection between the client and the server.

16. The method of claim 11, where generating the SYN+ACK message includes:

generating a signature from information associated with the client and the server; and storing the signature as an initial sequence number in the SYN+ACK message.

17. The method of claim 11, further comprising:

monitoring information provided by the server during a three-way handshake; and storing the information as the information associated with the capability of the server.

18. A system comprising:

a network device, implemented at least partially in hardware and connected between a client and a server, the network device to:

monitor, during a first mode of operation, information provided by the server during a three-way handshake, store the information as information associated with a capability of the server, receive, from the client, a request to establish a connection with the server, determine, based on receiving the request, whether the network device comprises the first mode of operation or a second mode of operation, forward, when the network device comprises the first mode of operation, the request to the server, perform, on behalf of the server and when the network device comprises the second mode of operation, a three-way handshake with the client, so that the information associated with the capability of the server being provided to the client during the three-way handshake, when performing the three-way handshake with the client, the network device being to:

receive a synchronization (SYN) message from the client, send a synchronization (SYN)+acknowledgment (ACK) (SYN+ACK) message to the client in response to the received SYN message, receive an ACK message from the client, and determine whether the three-way handshake with the client is successful, based on whether the received ACK message includes information that is based on the SYN+ACK message;

perform a three-way handshake with the server when the three-way handshake with the client is successful; and establish the connection between the client and the server when the three-way handshake with the server is successful.

19. The system of claim 18, where the SYN+ACK message includes the information associated with the capability of the server.

20. The system of claim 18, where the information associated with the capability of the server includes a value associated with at least one of a maximum segment size, a window scale size, a selective acknowledgment, or a window size, and when determining whether the network device comprises the first mode of operation or the second mode of operation, the network device being to:

determine whether a quantity of connection requests is less than a threshold value, the network device comprising the first mode of operation when the quantity of connection requests is less than the threshold value.

21. The system of claim 18, where the network device is a firewall connected between the client and the server.

* * * * *